US007493208B1

(12) United States Patent
Craine

(10) Patent No.: US 7,493,208 B1
(45) Date of Patent: Feb. 17, 2009

(54) PERSONAL TRAFFIC CONGESTION AVOIDANCE SYSTEM

(75) Inventor: Dean A. Craine, Bellevue, WA (US)

(73) Assignee: DAC Remote Investments LLC, Wilmington, DE (US)

( * ) Notice: Subject to any disclaimer, the term of this patent is extended or adjusted under 35 U.S.C. 154(b) by 0 days.

(21) Appl. No.: 11/401,103

(22) Filed: Apr. 10, 2006

Related U.S. Application Data

(63) Continuation of application No. 10/316,464, filed on Dec. 11, 2002, now Pat. No. 7,027,915.

(60) Provisional application No. 60/417,516, filed on Oct. 9, 2002.

(51) Int. Cl.
*G06F 19/00* (2006.01)
*G01C 21/26* (2006.01)
*G08G 1/127* (2006.01)
*G08G 1/133* (2006.01)

(52) U.S. Cl. ....................... 701/117; 701/122; 340/988; 340/995.13

(58) Field of Classification Search ................. 701/117, 701/118, 119, 120, 122, 200, 207, 208, 209, 701/210, 211, 213, 300, 301; 340/901, 902, 340/903, 904, 905, 909, 910, 917, 931, 933, 340/988, 989, 990, 995.12, 995.13, 995.19, 340/995.2, 995.21, 995.28
See application file for complete search history.

(56) References Cited

U.S. PATENT DOCUMENTS 5,428,545 A * 6/1995 Maegawa et al. ........... 701/210
5,485,161 A 1/1996 Vaughn
5,504,482 A * 4/1996 Schreder ................ 340/995.13
5,539,398 A * 7/1996 Hall et al. ................... 340/907
5,635,924 A * 6/1997 Tran et al. ................... 340/905
5,745,865 A * 4/1998 Rostoker et al. ......... 455/456.5
5,757,290 A * 5/1998 Watanabe et al. ...... 340/995.14
5,819,198 A 10/1998 Peretz
5,831,552 A * 11/1998 Sogawa et al. ......... 340/995.27
5,844,505 A 12/1998 Van Ryzin
5,892,463 A * 4/1999 Hikita et al. ........... 340/995.13
5,911,773 A * 6/1999 Mutsuga et al. ............. 701/200
5,933,094 A * 8/1999 Goss et al. .................. 340/905

(Continued)

*Primary Examiner*—Jack W Keith
*Assistant Examiner*—Edward Pipala
(74) *Attorney, Agent, or Firm*—Sterne, Kessler, Goldstein & Fox P.L.L.C.

(57) ABSTRACT

A personal traffic congestion avoidance system for drivers of motor vehicles traveling on roadways in motor vehicles with GPS-based navigational systems. The system includes a GPS-based navigational system that includes a GPS receiver connected to a visual display, a map database and a wireless communication device for communicating with a remote computer over a wireless communication network. The GPS-based navigation system continuously determines the motor vehicle exact physical location in a region that is intermittently or continuously uploaded to a remote computer via the wireless communication network. The remote computer is connected to a traffic monitoring service that provides current traffic congestion information thereto. When a traffic congestion event is in the designated vicinity of the current location of the motor vehicle or on a roadway that may affect the traffic on the roadway on which the motor vehicle is traveling, a warning is generated and delivered to the GPS-based navigational system. The driver may ignore the warning or take an alternative route to avoid the traffic congestion.

25 Claims, 5 Drawing Sheets

U.S. PATENT DOCUMENTS 5,977,884 A 11/1999 Ross
6,008,740 A 12/1999 Hopkins
6,163,277 A 12/2000 Gehlot
6,166,658 A 12/2000 Testa
6,213,401 B1 4/2001 Brown
6,236,933 B1 * 5/2001 Lang .......................... 701/117
6,246,948 B1 6/2001 Thakker
6,298,302 B2 * 10/2001 Walgers et al. .............. 701/209
6,317,058 B1 11/2001 Lemelson et al. ........... 340/910
6,401,027 B1 * 6/2002 Xu et al. ..................... 701/117
6,650,948 B1 11/2003 Atkinson et al. .............. 700/66
6,845,317 B2 1/2005 Craine
7,027,915 B2 4/2006 Craine ........................ 701/117
2002/0152026 A1 10/2002 Evans
2003/0033082 A1 2/2003 Yanagidaira et al.
2003/0052797 A1 3/2003 Rock et al.
2003/0195701 A1 10/2003 Ohler

* cited by examiner

PERSONAL TRAFFIC CONGESTION AVOIDANCE SYSTEM

This is a continuation application of U.S. patent application Ser. No. 10/316,464 filed on Dec. 11, 2002 now U.S. Pat. No. 7,027,915 which claims the benefit of U.S. provisional patent application No. 60/417,516, filed on Oct. 9, 2002.

BACKGROUND OF THE INVENTION

1. Field of the Invention

This invention relates to traffic congestion monitoring systems and, more particularly, to such systems designed to warn drivers of approaching traffic congestion on roadways while driving.

2. Description of the Related Art

Many drivers listen to radio stations that broadcast current traffic condition information during commuter periods. When a traffic report is broadcast, the report includes locations of "slow downs" or accidents, hereinafter known as traffic affecting events, throughout the listening region of the radio station. Drivers are required to listen closely to the entire report to determine whether one of the traffic affecting events reported concerns his or her commute. One problem with radio traffic reports is that traffic affecting events in the entire region are given which may not affect a particular driver. Also, because the length of the report is limited to 15 to 30 seconds, the number of traffic affecting events reported is restricted or the report is spoken at a fast rate, making it incomprehensible to the driver. Lastly, drivers may not be that familiar with the areas or addresses given for the traffic affecting events given during the report and will not know whether it will affect their commute.

Many motor vehicle manufacturers offer Global Positioning System (GPS)-based navigational systems in their motor vehicles. Such systems are very popular because they give drivers visual and audible guidance over the routes they drive. Such systems include a GPS receiver that receives signals from twenty orbiting satellites operated by the U.S. Department of Defense and a map database that indicates the driver's current location on a map of the region. Using the map database, drivers are able to select various routes to a desired destination in the region. The map database is stored on optical discs (i.e. CD-ROM or DVD-ROM disc) that are played in a disc player connected to the GPS receiver and located inside the motor vehicle.

The map and route guidance features are particularly useful because they enable drivers to select different routes and to request instructions to a chosen destination. When activated and traveling, the map and route guidance features present a map of the region with the current location of the motor vehicle and the roadways along the selected route highlighted. As the motor vehicle travels on the route, the map is constantly updated so that the motor vehicle's current location is always presented, along with approaching and passing roadways and intersections. Although most GPS-based navigational systems prevent the driver from entering new destinations while moving, most allow the driver to manually request a detour or a new route to a given destination if the need arises.

Except for the satellites, the GPS-based navigation system is located entirely inside the motor vehicle. The visual display, which is connected to the GPS receiver, is typically mounted on the center console of the motor vehicle. In many motor vehicles, the visual display is a "touch screen" with a plurality of menu buttons that enable the driver to activate the system, select previously traveled destinations, request route guidance and enter alphanumeric characters to search for addresses, intersections, and the names of new destinations.

What is needed is an inexpensive traffic congestion avoidance system that can be easily coupled to a motor vehicle's GPS-based navigational system that informs a driver of traffic affecting events in his vicinity or that may affect the roadways on his route so that he may select a detour or other routes to avoid the traffic affecting event.

SUMMARY OF THE INVENTION

It is an object of the present invention to provide a personal traffic congestion avoidance system for drivers of motor vehicles.

It is another object of the present invention to provide such a system that can be easily coupled to a motor vehicle GPS-based navigational system It is another object of the present invention to provide such a system that is simple to use and does not distract the driver when driving.

These and other objects of the present invention are met by a personal traffic congestion avoidance system disclosed herein which is capable of being coupled to a motor vehicle current GPS-based navigational system. The system includes a means for wireless communication that connects to the motor vehicle GPS-based navigational system and communicates with a remote computer via the means for wireless communication. The remote computer is connected to a traffic monitoring service that constantly monitors motor vehicle traffic on a plurality of roadways in the region.

During use, the visual display on the GPS-based navigational system presents a map of the region showing important roadways and points of interest. The exact physical location of the motor vehicle is displayed on the map along with the names of the roadways and points of interest. When the system is initially activated, the navigational system GPS receiver transmits the user's identification and password information to the remote computer informing the remote computer that the driver is an authorized user and currently connected to the system. Simultaneously, or shortly thereafter, the GPS receiver begins transmitting physical location information to the remote computer. When the remote computer recognizes the driver as an authorized user, it opens a user file and begins to collect the physical location information from the GPS receiver. While the driver is connected to the remote computer, the physical location information from the motor vehicle's GPS receiver is then intermittently or continuously uploaded to the remote computer via the means for wireless communication and network.

As mentioned above, the remote computer is connected to a traffic monitoring service that provides current traffic congestion information on a plurality of roadways in the region. Loaded into the working memory of the remote computer is a traffic selecting software program that compares the information in the user file with the traffic congestion information from the traffic monitoring service. When a traffic affecting event occurs, location information regarding the traffic affecting event is delivered from the traffic monitoring service to the remote computer. The remote computer then uses the traffic selecting software program and a map database to determine whether the traffic affecting event is in the designated vicinity, on a roadway currently used by the driver, or on a roadway that may be affected by the traffic affecting event based on the current location of the motor vehicle. If the motor vehicle is in the designated vicinity or traveling on an affected roadway, then an alert signal is created by the remote computer and transmitted via means for wireless communication to the GPS receiver located inside the motor vehicle. The alert signal, which contains location information regarding the traffic affecting event, may be displayed on the navigational system visual display or audibly broadcasted to the driver. The driver may ignore the alert or immediately change his or her route to avoid the traffic affecting event. The driver may also request assistance from the GPS-based navigational system route guidance feature to find an alternative route that avoids the traffic affecting event. Once a proposed route is selected, it may be transmitted to the remote computer to determine if it too may be affected by the traffic affecting event.

In the above-described system, the traffic monitoring service transmits all of the traffic congestion information in the region to the remote computer. The remote computer then determines whether any of the traffic affecting events are in the vicinity or affect roadways connected to the currently traveled roadway. It should be understood that the remote computer first determines the vicinity range and affected roadways of the user and then requests traffic affecting events that affect these roadways.

DESCRIPTION OF THE PREFERRED EMBODIMENT(S)

Figure 1:
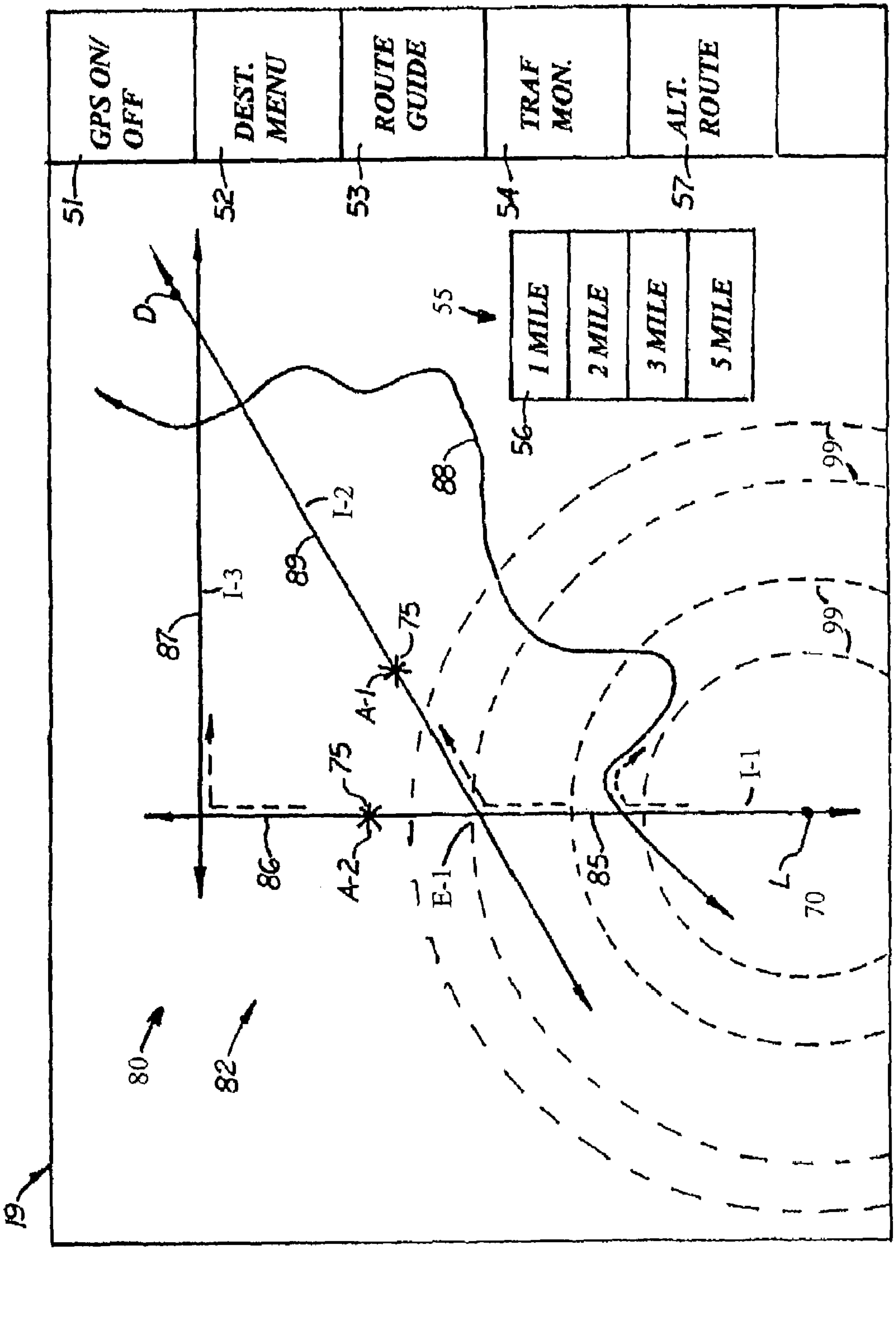
FIG. 1 is an illustration of a map depicting four roadways in a region showing the current location of a motor vehicle on one of the roadways and traveling to a destination, with two of the roadways having traffic affecting events.
Figure 2:
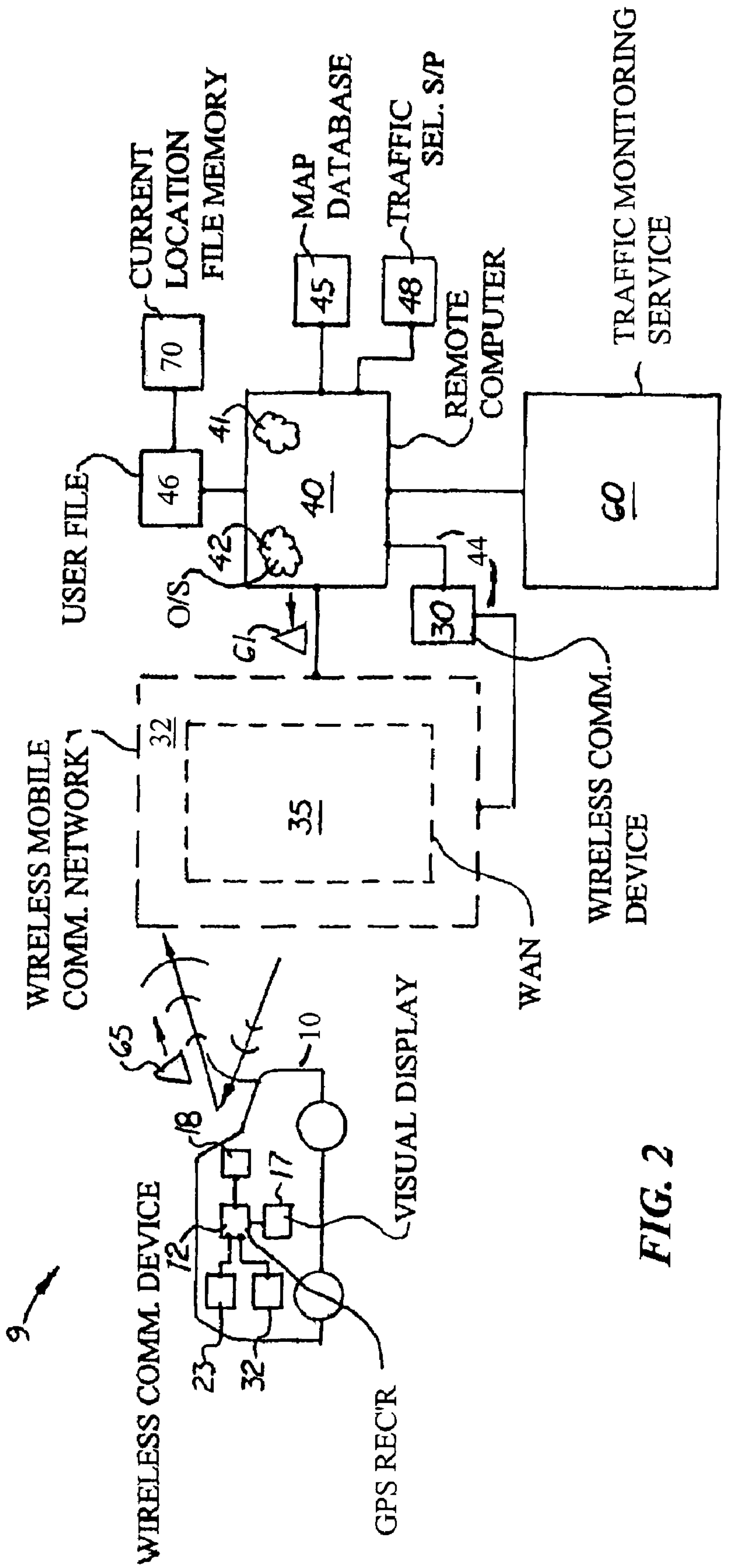
FIG. 2 is an illustration of the GPS-based navigational traffic warning system disclosed herein.
Figure 3:
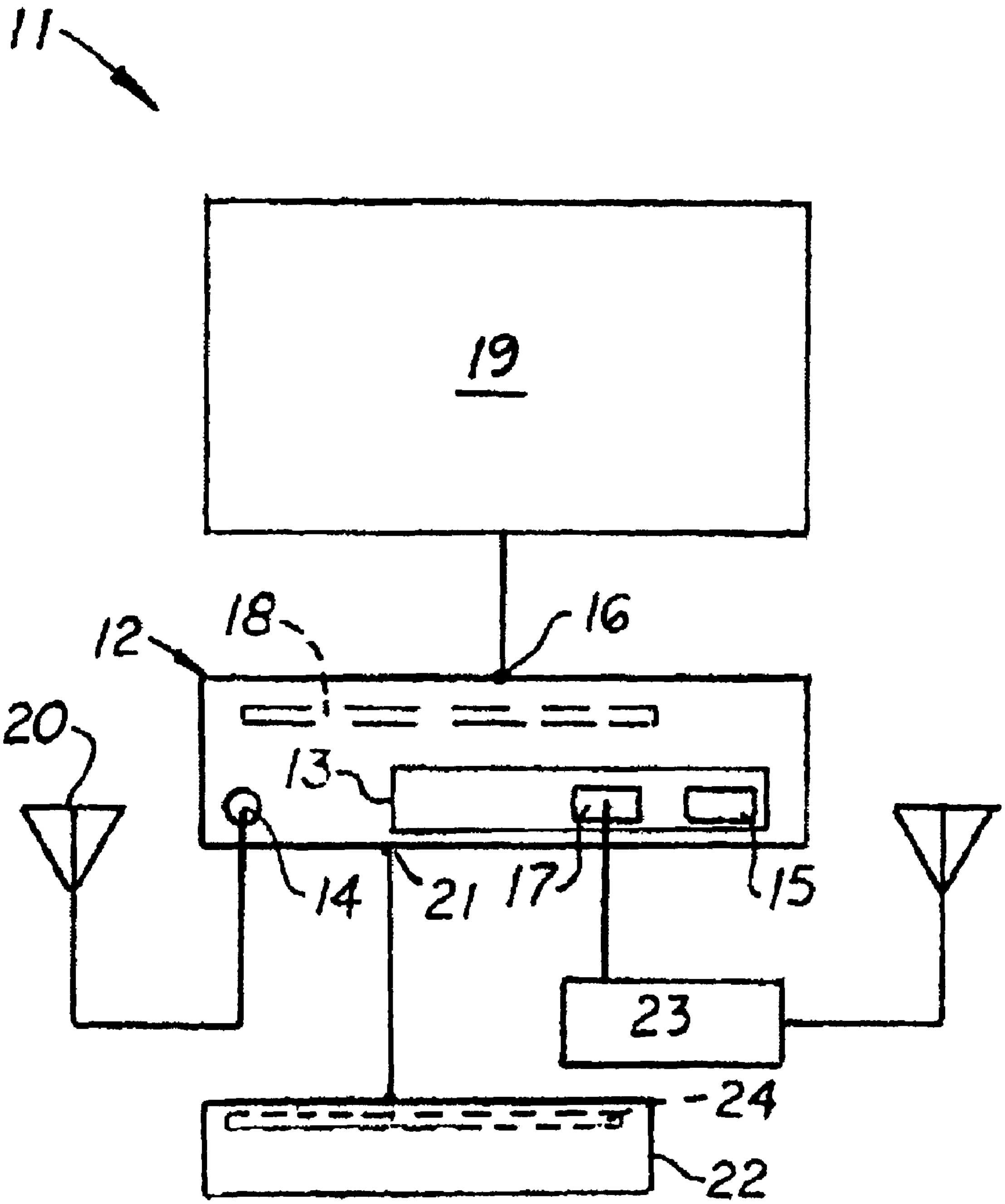
FIG. 3 is a rear elevational view of the GPS receiver connected to a GPS antenna, wireless transmitter, and receiver.
Figure 4:
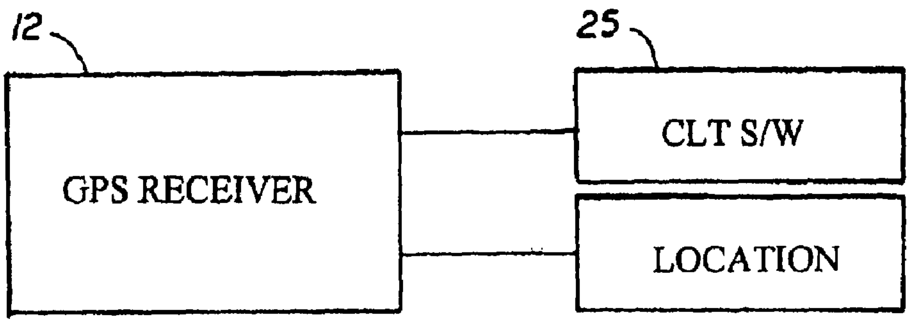
FIG. 4 is a diagram showing the information collected and transmitted by the GPS receiver.
Figure 5:
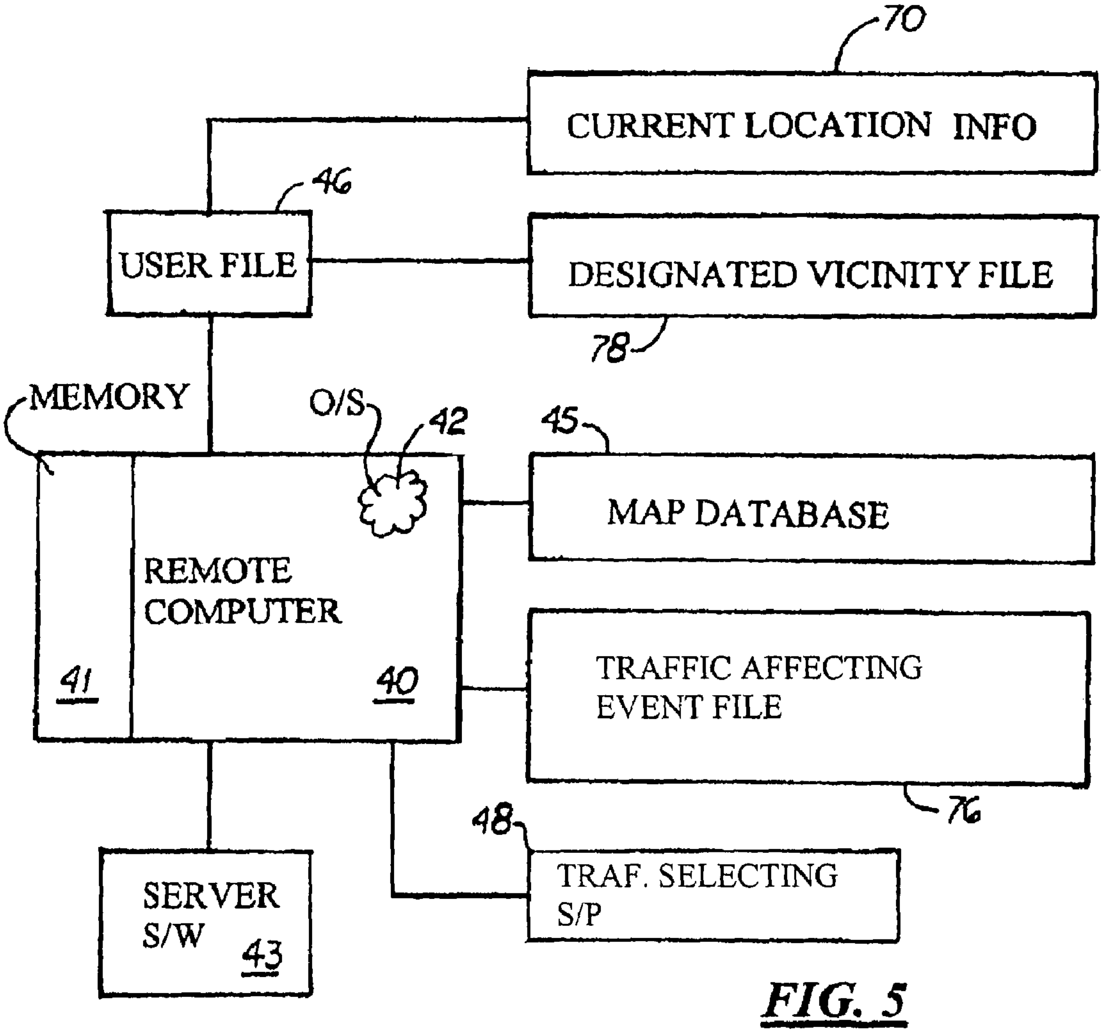
FIG. 5 is a diagram showing the information collected and transmitted by the remote computer.
Figure 6:
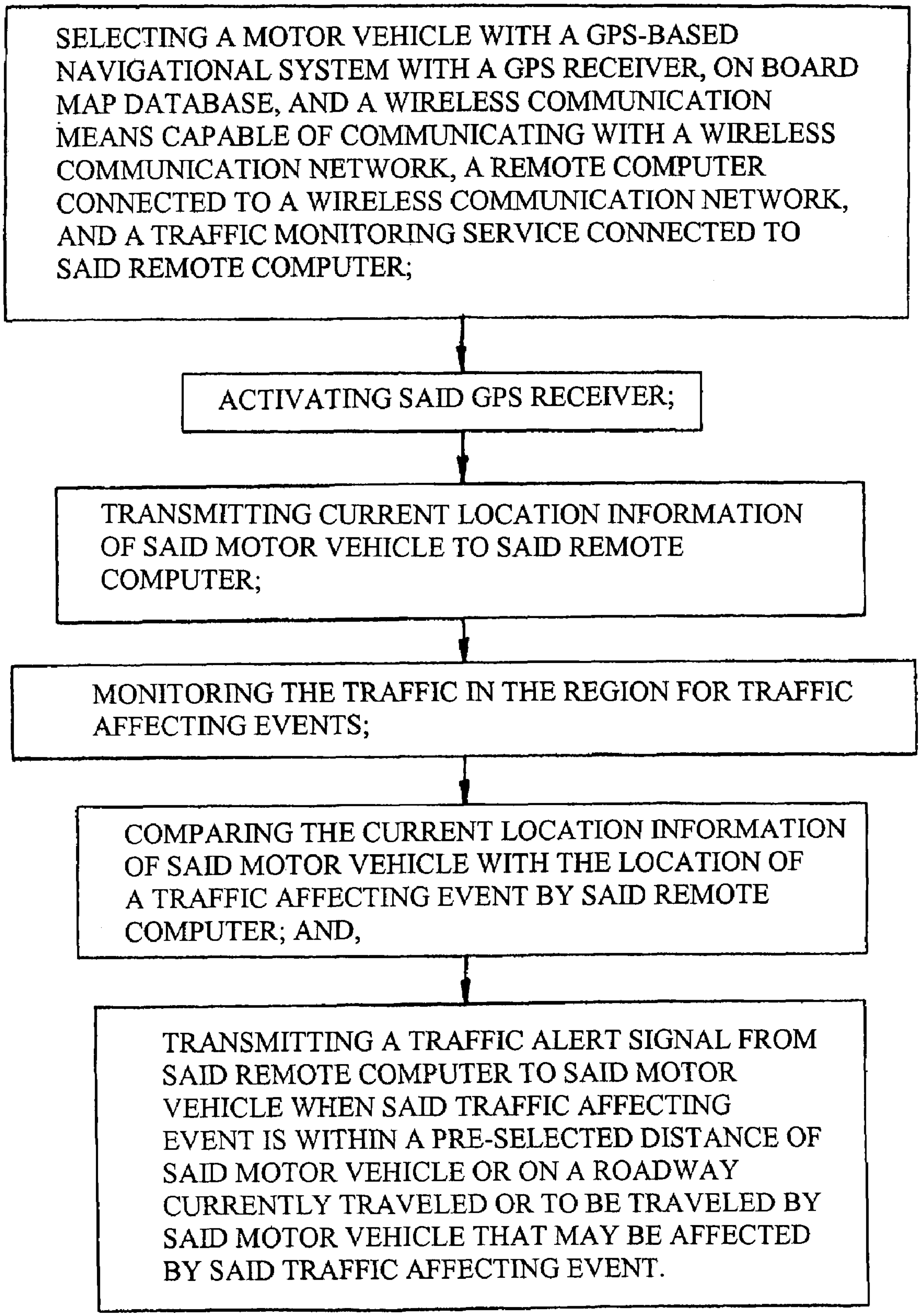
FIG. 6 is a diagram showing the steps included in the method for avoiding traffic congestion using the system disclosed herein.

Shown in the accompanying Figs., there is shown a personal traffic congestion avoidance system 9 that uses a GPS-based navigational system 11 located inside a motor vehicle 10 capable of sending and receiving data through a wireless communication link. The system 9 includes a wireless communication device 30 that communicates with a remote computer 40 via a wireless communication network 32. The remote computer 40 is connected to a traffic monitoring service 60 that monitors traffic on roadways 85-89 in the region 82.

The GPS navigational system 11 includes a GPS receiver 12 connected to a visual display 19 that presents a map 80 of a selected region 82 showing roadways 85-89, as shown on FIG. 1. The motor vehicle current location information 70 is also indicated on the map 80 along with names of the roadway and the points of interest (not shown). When the system 9 is initially activated, the GPS receiver 12 transmits a signal 65 to the remote computer 40 via the wireless communication device 30 and network 32. When the signal 65 from the GPS receiver 12 is recognized, the remote computer 40 opens a user file 46 and begins to collect current location information 70. The current location information 70 from the motor vehicle's GPS receiver 12 is then intermittently or continuously uploaded to the remote computer 40 via the wireless communication device 30 and network 32.

As mentioned above, the remote computer 40 is connected to a traffic monitoring service 60 that provides current traffic congestion information on a plurality of roadways 85-89 in the region 82. When a traffic affecting event 75 occurs, it is reported by the traffic monitoring service 60 to the remote computer 40, which uses a traffic selecting software program 48 and a map database 45 to determine whether the traffic affecting event 75 is in the designated vicinity of the last reported location of the motor vehicle 10 or on a roadway that may affect the last roadway on which the motor vehicle 10 was traveling. If the motor vehicle 10 is in the vicinity or traveling on such a roadway, then an alert signal 61 is created by the remote computer 40 and transmitted via the wireless communication network 32 to the GPS receiver 12 located inside the motor vehicle 10 to warn the driver of the traffic affecting event 75. The driver may ignore the alert or immediately change his route to avoid the traffic congestion. The driver may also request the GPS-based navigational system route guidance system to find an alternative route.

GPS-Based Navigational System

The GPS-based navigation system 11 includes a twelve-channel GPS receiver 12 with a CPU 13, memory 14, an operating system 15, AV port 16, a communication port 17 or PC-card slot 18, a visual display 19, and a GPS antenna 20. In the preferred embodiment, the system 11 has a guidance feature that provides visual and audible instruction to a selected destination from a current or designated location. Such GPS receivers 12 are manufactured by Alpine Electronics of America, Inc, of Tokyo, Japan, and Pioneer North America, Inc. of Tokyo, Japan. The GPS receiver 12 may include a built-in DVD disc player (not shown) or include ports 21 for connecting to a separate DVD disc player 22 with a map data base 24. A wireless modem 23 may be attached to the communication port 17, or a wireless PCMCIA card (not shown) may be inserted into the PC-card slot 18.

Loaded into the memory 14 of the GPS receiver 12 is a client-side software program 25 that stores the driver's user name, address, password, and network address and enables the GPS receiver 12 to communicate with the remote computer 40.

Remote Computer

The remote computer 40 may be a standard server-configured computer with suitable memory 41 and operating system 42 designed to communicate with the GPS receiver 12. The remote computer 40 includes server side software program 43 that communicates with the client side software program 25, used by the GPS receiver 12 and a traffic selecting software program 48.

The remote computer 40 is designed to collect stored location data from the GPS receiver 12 and to process information from the traffic monitoring service 60. In the preferred embodiment, the remote computer 40 is connected via a landline connection link 44 to a wide area computer network 35 that is linked to a wireless communication network 32. It should be understood, however, that the remote computer 40 could include a wireless communication device 30 such as a cellular telephone transmitter/receiver to communicate directly to the wireless modem 23 or card (not shown) attached to the GPS receiver 12.

The remote computer 40 is connected to a map database 45 of the region 82 similar to the map database 24 used by the GPS receiver 12. During use, the physical location of a traffic affecting event 75 in the region is reported and sent to the remote computer 40 and stored in a traffic affecting event file 76. In the first embodiment, the remote computer 40 then uses the traffic selecting software program 48 and the map database 45 to determine whether the traffic affecting event 75 is within the designated vicinity of the last reported location of the motor vehicle 10 or on a roadway 86, 89 that may affect the flow of traffic on a roadway 85 currently used by the motor vehicle 10. The remote computer 40 continues to compare the information in the traffic affecting event file 76 with the current location information 70 and map database 45 until the user logs off from the system 9.

In the first embodiment, only traffic affecting events 75 located in the current vicinity, on the current roadway 85, or a roadway 86, 89 that may affect the flow of traffic on the currently used roadway 85 are transmitted to the GPS receiver 12. The size of the file containing such information is relatively small compared to the size of the file needed to transmit all of the traffic affecting events 75 in the region to the GPS receiver 12. Since the size of the file inversely affects the download time and available memory, it is desirable to use smaller files for faster communication. Also, since most users adjust the scale on the visual displays from ⅛ to 1 mile distances, traffic affecting events 75 occurring in areas not used by the driver are not needed.

In a second embodiment, the remote computer 40 would first inform the traffic monitoring service 60 of the designated vicinities and roadways to be monitored, which are stored in a designated vicinity file 78, and then request only traffic affecting events 75 that impact them.

Traffic Monitoring Service

The traffic monitoring service 60 may be the regional Department of Transportation or other agency that continuously monitors traffic in a region. The traffic monitoring service 60 may also be a private company or service such as the service described in U.S. Pat. No. 6,236,933, which is incorporated herein.

In the first embodiment, all of the traffic affecting events 75 in the region are sent to the remote computer 40 which then determines whether each traffic affecting event 75 affects a particular user currently logged onto the system 9. It should be understood that the traffic monitoring service 60 could be instructed to transmit to the remote computer 40 only traffic information that falls within a designated vicinity or roadway.

Operation

The GPS-based navigational system 11 in the motor vehicle 10 is first activated by pressing the receiver ON/OFF manual button 51. A destination may be selected using the Destination Menu button 52 along with the Route Guidance button 53 for assistance in selecting a particular route. The traffic-monitoring menu button 54 on the visual display 19 is then activated with causes the GPS receiver 12 to log onto the remote computer 40 via the wireless modem 23 and the wireless communication network 32. During the log-on process, the GPS receiver 12 uses the client-side software program 25 to communicate with the server side software program 43 loaded into the memory 41 of the remote computer 40 to transmit the transmit the user's previously registered name, a password, and the GPS receiver network address to the remote computer 40. The remote computer 40 identifies the user and opens a user file 46. Simultaneously or immediately after logging onto the remote computer 40, the GPS receiver

12 begins transmitting current location information 70 to the remote computer which is temporarily stored in the user file 46. During the initial log-on process, an optionally beginning display 55 may be presented on the visual display 19 which prompts the user to select one of the monitoring distance buttons 56, (1 mile to 5 miles shown) from the motor vehicle 10 to monitor traffic congestion. The remote computer 40 then begins to monitor traffic affecting events 75 sent from the traffic monitoring service 60 for traffic affecting events 75 within the designated monitoring distance or affected roadways.

FIG. 1 depicts a visual display 19 coupled to the GPS receiver 12 that presents a map 80, with the motor vehicle 10 located at location "L" and traveling northbound on roadway I-1. Also presented on the visual display 19 is a plurality of monitoring distance buttons 56 that correspond to mileage distances represented in concentric circles 99 also shown on the visual display 19. Prior to using the system 9, the user selects one the of the monitoring distances buttons 56 to request a distance around the current location to be monitored. The motor vehicle 10 is currently traveling towards the destination "D" located northeast from its current location. According to the motor vehicle route guidance system 53 feature, the fastest route is to follow roadway I-1 northbound and then take the exit E-1 to roadway I-2, and then follow roadway I-2 to destination "D".

When the motor vehicle 10 is traveling northbound on roadway I-1, and located at location "L", a traffic affecting event 75 occurs at location "A-1" on roadway I-2. When a traffic affecting event 75 is detected by the traffic monitoring service 60 and information regarding the traffic affecting event 75 is sent to the remote computer 40, the remote computer 40 records the traffic affecting event 75 and determines whether the traffic affecting event 75 is within the designated vicinity of location L or on any of roadways I-2, I-3, or I-4 that connects to roadway I-1. Since roadway I-2 connects to roadway I-1, the remote computer 40 immediately sends a traffic alert signal 61 to the motor vehicle's GPS receiver 12. A traffic alert signal 61 contains the address or latitude/longitudinal coordinates of the traffic affecting event 75 and may contain the name of a roadway, direction of travel, or the closest exit off of roadway I-1. The exact location of the traffic affecting event 75 may also be displayed on the visual display 19, as shown in FIG. 1. An audible signal may also be broadcast. If the route guidance 53 feature is used, an alternative route button 57 may also be presented on the visual display 19 enabling the driver to request a detour or new route to the destination "D".

Referring to FIG. 1, the driver elects to follow a new, slightly longer route to destination "D" using roadway I-3. Shortly thereafter, a second traffic alert signal 61 is delivered to the GPS receiver 12 regarding a second traffic affecting event 75 at location A-2 that has occurred on roadway I-1. The driver changes his or her plans and elects to follow a third, much longer route using roadway I-4 to the destination "D".

Using the above system 9, a method of avoiding traffic congestion is provided which includes the following steps:

a. selecting a motor vehicle 10 with a GPS-based navigational system 11 with a GPS receiver 12 and on board map database 24, and a wireless communication device 30 capable of communicating with a wireless communication network 32, a remote computer 40 connected to a wireless communication network 32, and a traffic monitoring service 60 connected to said remote computer 40;

b. activating said GPS receiver 12;

c. transmitting current location information 70 of said motor vehicle 10 to said remote computer 40;

d. monitoring the traffic in the region 82 for traffic affecting events 75;

e. comparing the current location information 70 of said motor vehicle 10 with the location of a traffic affecting event 75 by said remote computer 40; and f. transmitting a traffic alert signal 61 from said remote computer 40 to said motor vehicle 10 when said traffic affecting event 75 is within a pre-selected distance of said motor vehicle 10 or on a roadway currently traveled 85 or to be traveled 86 by said motor vehicle 10 that may be affected by said traffic affecting event 75.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An apparatus for monitoring traffic, comprising:

a vehicle position determination device configured to determine a position of a vehicle in substantially real time;

a wireless transceiver coupled to the vehicle position determination device and configured to transmit a first signal to a remote computer and to receive a second signal from the remote computer, the first signal representing the position of the vehicle, the second signal representing an indication that a position of a traffic affecting event is within a vicinity of the position of the vehicle; and an indication device coupled to the wireless transceiver and configured to indicate the indication in response to the wireless transceiver receiving the second signal;

wherein the remote computer is configured to receive the first signal from the wireless transceiver and a third signal from a traffic monitoring system, to determine if the position of the traffic affecting event is within the vicinity of the position of the vehicle, and to transmit the second signal to the wireless transceiver, the third signal representing the position of the traffic affecting event.

2. The apparatus of claim 1, wherein the vehicle position determination device comprises a global positioning system device.

3. The apparatus of claim 1, wherein the vehicle position determination device is a component of a navigational system, the navigational system is further configured to determine a route from the position of the vehicle to a position of a destination, and the vicinity comprises the route.

4. The apparatus of claim 3, wherein the vicinity further comprises a road that affects a flow of traffic along the route.

5. The apparatus of claim 3, wherein the indication device is configured to display, on the navigational system, the position of the traffic affecting event.

6. The apparatus of claim 3, wherein the indication device is configured to broadcast audibly information about the traffic affecting event.

7. The apparatus of claim 3, wherein the navigational system is further configured to determine a second route from the position of the vehicle to the position of the destination, wherein the second route avoids the position of the traffic affecting event.

8. An apparatus for monitoring traffic, comprising:

a wireless transceiver configured to receive a first signal from a remote vehicle and to transmit a second signal to the remote vehicle, the first signal representing a position of the remote vehicle, the second signal representing an indication that a position of a traffic affecting event is within a vicinity of the position of the remote vehicle; and a computer coupled to the wireless transceiver and configured to receive the first signal from the wireless transceiver and a third signal from a traffic monitoring system, to determine if the position of the traffic affecting event is within the vicinity of the position of the remote vehicle, and to produce the second signal, the third signal representing the position of the traffic affecting event;

wherein the traffic monitoring system is configured to determine the position of the traffic affecting event and to produce the third signal.

9. The apparatus of claim 8, wherein the computer is further configured to produce a fourth signal to determine if the position of the traffic affecting event is within the vicinity of the position of the remote vehicle, the fourth signal represents the vicinity of the position of the remote vehicle, and the traffic monitoring system is further configured to receive the fourth signal, to determine if the position of the traffic affecting event is within the vicinity of the position of the remote vehicle, and to produce the third signal if the position of the traffic affecting event is within the vicinity of the position of the remote vehicle.

10. The apparatus of claim 8, wherein the traffic monitoring system comprises a traffic monitoring service.

11. The apparatus of claim 8, wherein the traffic monitoring system comprises:

a camera positioned along a section of a road and configured to produce an image of the section of the road;

a transmitter coupled to the camera and configured to transmit a fourth signal, the fourth signal representing the image of the section of the road; and a remote processing system configured to receive the fourth signal, to determine if the image of the section of the road shows the traffic affecting event, and to produce the third signal.

12. The apparatus of claim 11, wherein the computer includes the remote processing system.

13. The apparatus of claim 8, wherein the traffic monitoring system comprises:

a vehicle position determination device configured to determine a position of a second remote vehicle in substantially real time;

a wireless transmitter coupled to the vehicle position determination device and configured to transmit a fourth signal, the fourth signal representing the position of the second remote vehicle; and a remote processing system configured to receive the fourth signal, to determine if the position of the second remote vehicle coincides with the position of the traffic affecting event, and to produce the third signal.

14. The apparatus of claim 13, wherein the computer includes the remote processing system.

15. The apparatus of claim 13, wherein the remote processing system is configured to determine a speed of the second remote vehicle to determine if the position of the second remote vehicle coincides with the position of the traffic affecting event.

16. The apparatus of claim 13, further comprising a vehicle speed determination device configured to determine a speed of the second remote vehicle in substantially real time, wherein the wireless transmitter is further configured to transmit a fifth signal, the fifth signal represents the speed of the second remote vehicle, and the remote processing system is further configured to receive the fifth signal to determine if the position of the second remote vehicle coincides with the position of the traffic affecting event.

17. A computer-readable medium having computer-executable instructions for monitoring traffic by a method comprising:

determining a position of a vehicle in substantially real time;

transmitting a first signal to a remote computer, the first signal representing the position of the vehicle;

receiving a second signal from the remote computer, the second signal representing an indication that a position of a traffic affecting event is within a vicinity of the position of the vehicle; and indicating, in response to the received second signal, the indication;

wherein the computer-readable medium is configured to be coupled to the vehicle; and wherein the remote computer is configured to receive the first signal from the computer-readable medium and a third signal from a traffic monitoring system, to determine if the position of the traffic affecting event is within the vicinity of the position of the vehicle, and to transmit the second signal to the computer-readable medium, the third signal representing the position of the traffic affecting event.

18. The computer-readable medium of claim 17, wherein the indicating comprises displaying, on a navigational system, the position of the traffic affecting event.

19. The computer-readable medium of claim 17, wherein the indicating comprises broadcasting audibly information about the traffic affecting event.

20. The computer-readable medium of claim 17 having the computer-executable instructions for monitoring traffic by the method further comprising:

determining a route from the position of the vehicle to a position of a destination, wherein the vicinity comprises the route.

21. The computer-readable medium of claim 20 having the computer-executable instructions for monitoring traffic by the method further comprising:

determining a second route from the position of the vehicle to the position of the destination, wherein the second route avoids the position of the traffic affecting event.

22. A computer-readable medium having computer-executable instructions for monitoring traffic by a method comprising:

receiving a first signal from a remote computer, the first signal representing a position of a remote vehicle;

receiving a second signal from a traffic monitoring system, the second signal representing a position of a traffic affecting event;

determining if the position of the traffic affecting event is within a vicinity of the position of the remote vehicle; and transmitting a third signal to the remote computer, the third signal representing an indication that the position of the traffic affecting event is within the vicinity of the position of the remote vehicle;

wherein the remote computer is configured to be coupled to the remote vehicle, to determine the position of the remote vehicle, to transmit the first signal to the computer-readable medium, to receive the third signal from the computer-readable medium, and to indicate the indication; and wherein the traffic monitoring system is configured to determine the position of the traffic affecting event and to produce the third signal.

23. The computer-readable medium of claim 22 having the computer-executable instructions for monitoring traffic by the method further comprising:

producing a fourth signal, the fourth signal representing the vicinity of the position of the remote vehicle;

wherein the traffic monitoring system is further configured to receive the fourth signal, to determine if the position of the traffic affecting event is within the vicinity of the position of the remote vehicle, and to produce the third signal if the position of the traffic affecting event is within the vicinity of the position of the remote vehicle.

24. A method for monitoring traffic, comprising:

determining, at a vehicle, a position of the vehicle in substantially real time;

transmitting, from the vehicle to a remote computer, a first signal, the first signal representing the position of the vehicle;

receiving, at the remote computer, the first signal;

receiving, at the remote computer, a second signal from a traffic monitoring system, the second signal representing a position of a traffic affecting event;

determining, at the remote computer, if the position of the traffic affecting event is within a vicinity of the position of the vehicle;

transmitting, from the remote computer to the vehicle, a third signal, the third signal representing an indication that the position of the traffic affecting event is within the vicinity of the position of the vehicle;

receiving, at the vehicle, the third signal; and indicating, at the vehicle, in response to the received third signal, the indication that the position of the traffic affecting event is within the vicinity of the position of the vehicle.

25. The method of claim 24, further comprising:

conveying, from the remote computer to the traffic monitoring system, a fourth signal, the fourth signal representing the vicinity of the position of the vehicle;

receiving, at the traffic monitoring system, the fourth signal;

determining, at the traffic monitoring system, if the position of the traffic affecting event is within the vicinity of the position of the vehicle; and producing, at the traffic monitoring system, the second signal if the position of the traffic affecting event is within the vicinity of the position of the vehicle.

* * * * *